United States Patent [19]
Tamaribuchi

[11] Patent Number: 5,979,015
[45] Date of Patent: *Nov. 9, 1999

[54] ERGONOMIC HAND GRIP AND METHOD OF GRIPPING

[76] Inventor: Stephen K. Tamaribuchi, 10432 Ananda La., Rancho Cordova, Calif. 95670

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,199

[22] Filed: Dec. 27, 1996

[51] Int. Cl.$^6$ ..................................................... A63C 11/22
[52] U.S. Cl. .................................. 16/110 R; 16/DIG. 19; 280/821; 74/551.9
[58] Field of Search .......................... 16/110 R, DIG. 12, 16/DIG. 19; 74/551.9, 551.8; D21/198; D8/80, 303, 313; 280/821, 819

[56] References Cited

U.S. PATENT DOCUMENTS

| | | | |
|---|---|---|---|
| 157,634 | 12/1874 | Reagan | 16/DIG. 12 X |
| D. 226,736 | 4/1973 | Benis | D86/10 |
| 1,503,251 | 7/1924 | Schoof | 16/DIG. 12 X |
| 3,879,048 | 4/1975 | Penney | 280/821 |
| 4,641,857 | 2/1987 | Galiunas | 280/821 |
| 4,934,024 | 6/1990 | Sexton, I | 16/111 R |
| 5,058,923 | 10/1991 | Dale | 280/821 |
| 5,072,934 | 12/1991 | Blanes | 272/117 |
| 5,076,569 | 12/1991 | Gootter | 482/49 |
| 5,159,851 | 11/1992 | Rahmes | 74/551.9 |
| 5,235,871 | 8/1993 | Yamazaki et al. | 74/551.8 |
| 5,692,265 | 12/1997 | Dalury | 74/551.9 X |

*Primary Examiner*—Lanna Mai
*Assistant Examiner*—Avraham H. Lerner
*Attorney, Agent, or Firm*—Mark C. Jacobs, Esq.

[57] ABSTRACT

An ergonomic hand grip is provided for use with a wide variety of devices and equipment such as ski poles and bicycle handlebars. In a basic illustrated form, the grip has an elongated base that is contoured so that, when gripped, the thumb is bent and the hand and wrist are in a neutral position. In the neutral position, the hand is not cocked or hyper-extended, but rather is generally aligned with the forearm. In particular, a thumb support is provided adjacent to one end of the base to position and support the thumb in the bent position. The base is also provided with suitable depressions and/or recessed areas to receive enlarged portions of the gripping hand to cause the knuckles to be in generally linear alignment. Further, the end of the base opposite the thumb support is reduced in size to allow disproportionately more contraction of the lowermost two fingers, and primarily the lowermost or little finger. When used in certain applications such as for ski poles where the base is generally upright, the base is desirable tilted slightly forwardly. The grip tends to promote improved alignment and stabilization of the parts of the user's body and in particular stabilize the user's shoulders, and in turn his/her hips, legs, etc. for greater stability and efficiency of movement. The grip also facilitates the users ability to resist stress applied to the grip.

30 Claims, 5 Drawing Sheets

ND METHOD# ERGONOMIC HAND GRIP AND METHOD OF GRIPPING

BACKGROUND AND OF THE INVENTION

The human body is inter-active on a cellular and on a structural level. The present invention directed toward is the structural level, which means that the physical actions in one part of the body can affect the rest of the body.

A simple example is that of a lever. If downward force is applied to one end of the lever the other end will rise. Further, the fulcrum itself is affected by the increase in pressure exerted upon it or the fulcrum point may become unstable. The musculature of the human body operates utilizing the principles of mechanical levers. A determining factor of muscular efficiency is the stability of the connecting points of the muscles. If the muscles do not have stable connecting points, muscle action will displace the body rather than create the desired limb movement. Another major factor is muscular and structural alignment. The vast majority of the muscles in the human body are designed to function in a linear direction and not in a spiral direction. If the skeletal frame is misaligned when muscular action occurs, the body will be displaced. This reduces muscular efficiently and increases the probability of injury. It is also important to note that the shoulders and the hips are interactive: if one is displaced the other will follow suit.

An illustration of this is presented in the forward reaching motion. With the thumb extended, upon full-extension of the arm the shoulder is displaced to an unstable position. Pulling the hand back from an unstable shoulder position will displace the shoulder even further, which disallows the proper use of the chest, arm and abdominal muscles. Try the same reaching action with the thumb bent. The shoulder displaces very little and remains stable. During this pulling action the muscles of primary use are the biceps, triceps, pectorals, and the abdominal.

Conventional hand grips have not taken these considerations sufficiently into account.

SUMMARY OF THE ILLUSTRATED APPARATUS

In general, the illustrated ergonomic hand grips align the skeletal structure of the hand, causing specific muscles in the hand, arm, and chest to become activated. This creates a stabilizing effect through the shoulder girdle, which in turn helps to stabilize the rest of the body. This also enhances the users ability to resist destabilizing stress forces applied to the grip.

Figures 1A, 1B, 1C, 1D, 2A, 3A:
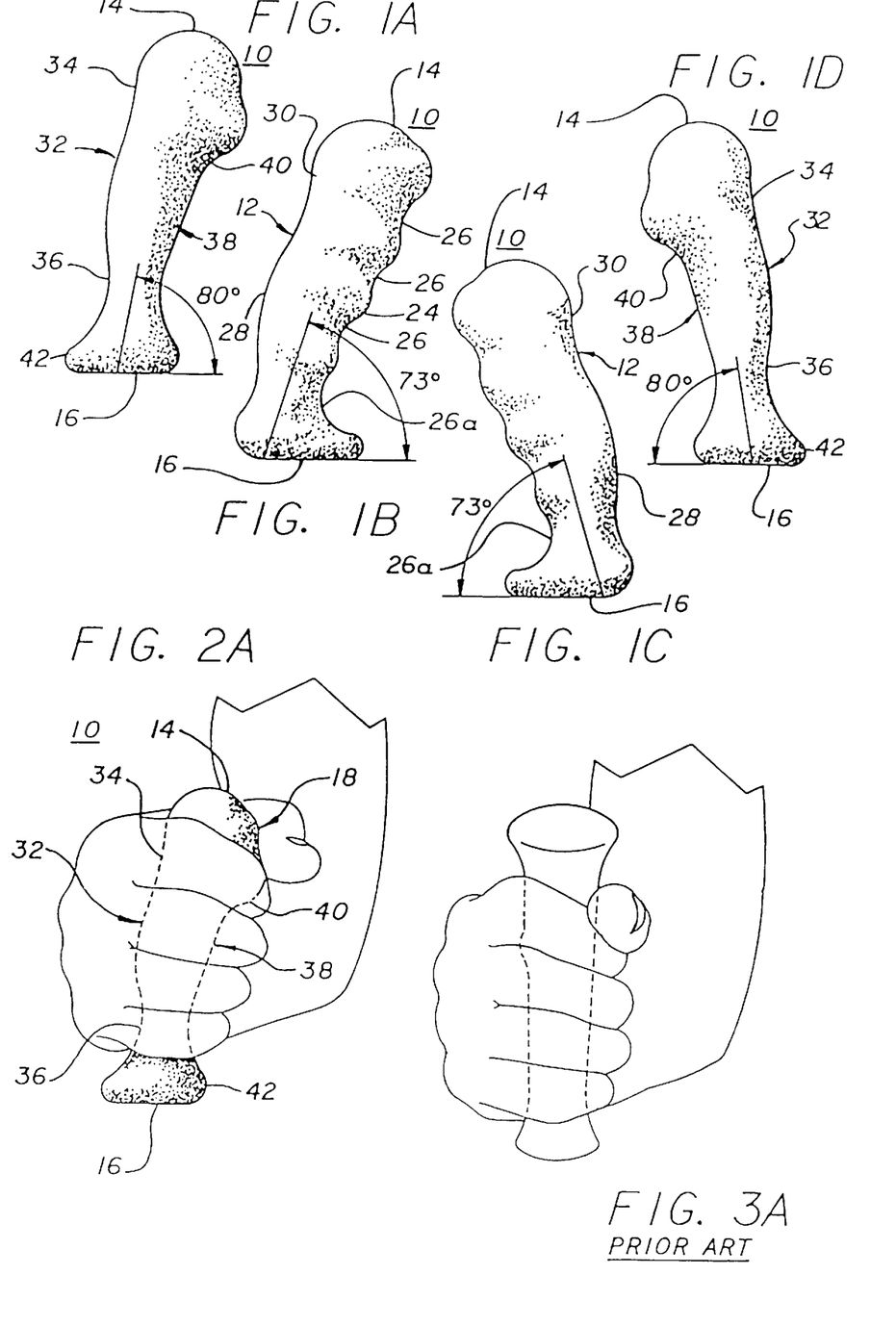
FIGS. 1A, 1B, 1C, and 1D are front, left side, right side, and rear views, respectively, of a right-hand hand grip embodying a presently preferred basic form of the invention.
FIG. 2A is a front view of the right-hand grip of FIGS. 1A–1D being held by the light hand of a user.
FIG. 3A is a front view of prior art conventional right-hand grip being held by the right hand of a user.
Figures 2B, 2C, 3B, 3C:
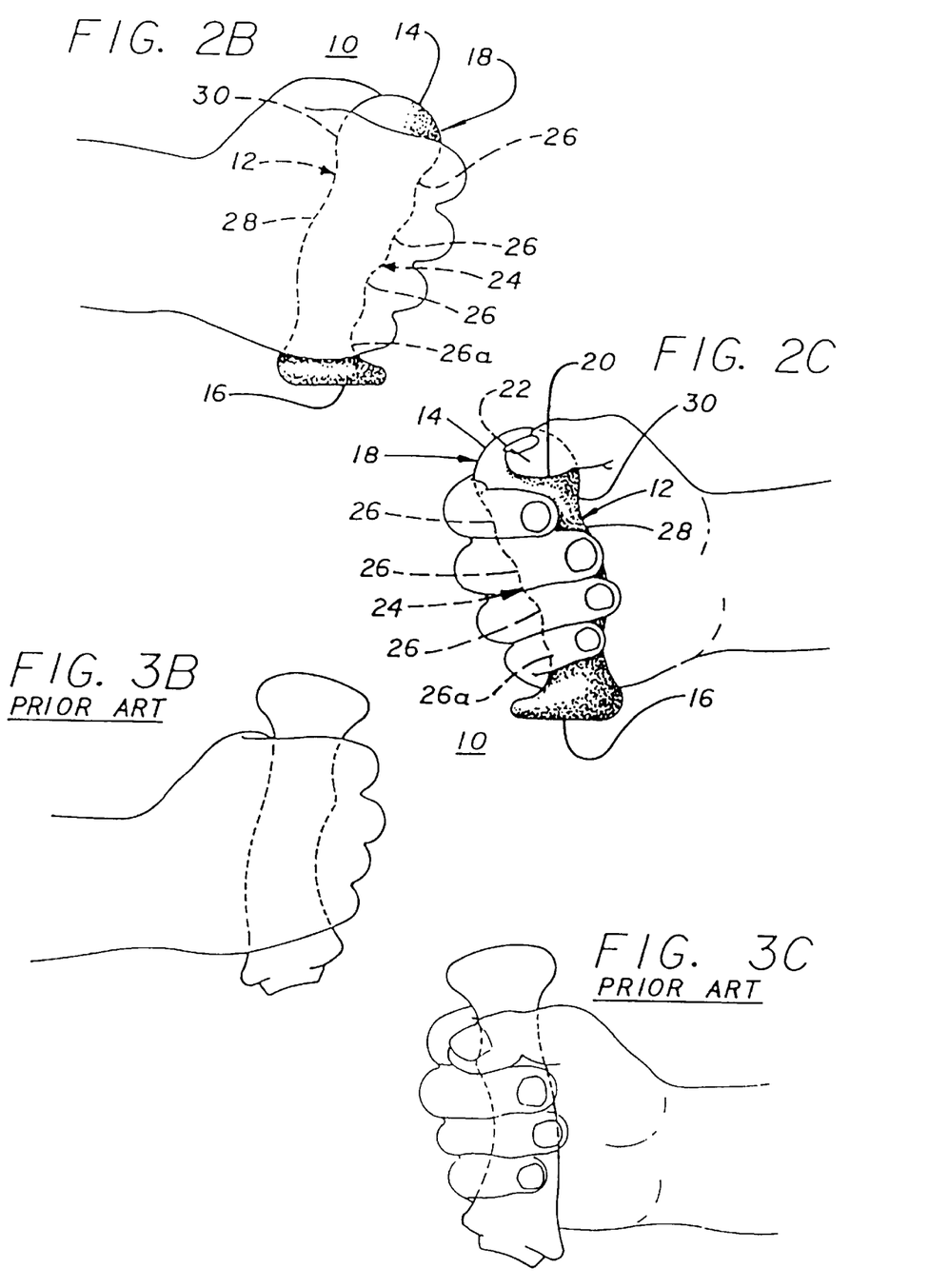
FIG. 2B is a left side view of the right-hand grip of FIGS. 1A–1D being held by the right hand of a user.
FIG. 2C is a right side view of the right-hand grip of FIGS. 1A–1D being held by the light hand of a user.
FIG. 3B is a left side view of the prior art grip of FIG. 3A being held by a user.
FIG. 3C is a right side view of the prior art grip of FIG. 3A being held by a user.
Figures 2D, 2E:
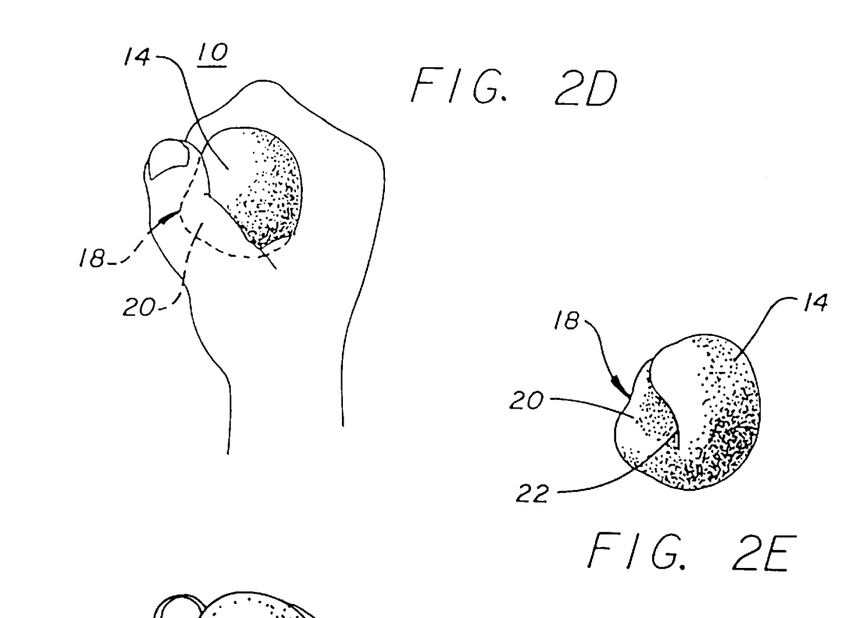
FIG. 2D is a top view of the right-hand grip of FIGS. 1A–1D being held by the night hand of a user.
FIG. 2E to an unobstructed top view of the grip of FIG. 2D.

By way of example, FIGS. 1 and 2 show one basic form of the illustrated hand grip in a generally upright orientation. It will be noted that:

1. As the hand wraps around the grip, the fingers are placed in precise positions along the grip. There are cut away or recessed areas which receive enlarged hand portions to maintain the desired skeletal alignment of the hand.
2. The thumb is placed in a bent position. This a) keeps the metacarpals and phalanges from being displaced, b) keeps the hand from over pronation (rotating inward), and c) helps hold the bones of the hand on a single plane (which allows the fingers to contract in a linear pattern; otherwise the fingers would twist as they are contracted).
3. The little and ring finger grooves of the grip are smaller, placing an emphasis in the contraction of these two fingers. This action does two things: a) stabilizes the hand position, and b) activates the use of the triceps and the deltoid muscles, stabilizing the shoulder girdle and the back.
4. The hand is positioned at a slight forward angle. This stabilizes the wrist position by reducing the tendency to arch the back of the hand toward the elbow (arching the back of the hand toward the elbow displaces the shoulder girdle).

IN THE DRAWINGS

FIG. 5A illustrates the use of the ergonomic grip of FIGS. 1A–1D for ski poles.

FIG. 5B illustrates the use of a conventional prior art grip for ski poles

FIG. 6A illustrates the use of the ergonomic grip of FIGS. 1A–1D for a bicycle.

FIG. 6B illustrates the use of a conventional prior art hand grip for a bicycle.

FIG. 7B is a top view of one hand performing excessive ulnar deviation toward the little finger and a second hand performing excessive radial deviation towards the thumb.

DETAILED DESCRIPTION OF THE DRAWINGS

As described briefly above, and in detail below, the illustrated ergonomic hand grip of FIGS. 1 and 2 provides various features including the following:

The ergonomic hand grip aligns the skeletal structure of the hand, allowing specific muscles in the hand, arm, and chest to be utilized in an efficient manner. This creates a stabilizing effect through the shoulder girdle which in turns help to stabilize the rest of the body. This also counteracts stress forces on the grip.

As the hand wraps around the grip, the fingers and thumb are placed or guided to precise positions relative to the grip:

1. The Thumb Shelf, Which Supports the Thumb in a Bent Position
   a) Keeps the metacarpals and phalanges from being displaced by drawing the bones back to a neutral position. When the thumb is in an extended position the metacarpal acts as a lever and shifts the bones of the hand out of a neutral alignment, creating ulnar deviation.
   b) Keeps the hand from over-pronation (rotating inward). The extended thumb initiates independent pronation of the hand causing the wrist and elbow to move in an opposing direction (i.e., the hand rotates inward and the wrist and elbow want to rotate away from the body).
   c) Helps hold the bones of the hand on a single plane. This allows the fingers to contract in a linear pattern. Otherwise the fingers twist as they are contracted. The extended thumb also causes the wrist and hand to hyper extend.

2. The Posterior Contours
   a) Maintain the neutral alignment of the metacarpal (the bones in the hand).
   b) Help keep the wrist from hyper-extending (arcing the palm toward the elbow).
   c) Help control radial and ulnar deviation (lateral movement of the hand toward the thumb or the little finger).

3. The Finger Grips and Grip Angle
   a) The diameter of the grip at the little and ring fingers areas of the grip are smaller to place an emphases in the contraction of these two fingers. This action does two things: i) stabilizes the hand position, and ii) activates the use of the triceps and the deltoid muscles, in turn stabilizing the shoulder girdle, the neck and the back,
   b) The graduated diameter, the grip angle and finger grips help hold the hand and the wrist in a neutral position keeping the hand from performing ulnar or radial deviation and hyper extension.

4. The Lateral Contours
   a) Maintain the lateral alignment of the metacarpal. If the metacarpal are displaced the wrist will slightly hyper extend in the rest position, the elbow will slightly elevate away from the torso and the shoulder girdle will slightly rotate to a forward position. These new positions are all unstable. When the hand is asked to perform some physical action, the hyper extension will increase, the elbow will move further laterally away from the body and the shoulder girdle will rotate further into an unstable position.

5. Lateral Angulation (Slightly Forward)

Creates a slight rotation of the hand, wrist and forearm on a single plane. The normal pronation of the hand has the rotating in one direction and the wrist and forearm rotating in an opposing direction. The need for the lateral angulation varies according to what the grip is used for; in some cases it may not be necessary.

FIGS. 1A–1D and 2A–2D show in detail a basic handgrip 10 which embodies the present invention.

The illustrated grip 10 includes an elongated base or section 12 which has a longitudinal central axis and opposed ends 14, 16. The grip 10 has a sculptured or contoured surface to accommodate the hand of the user. Of primary importance, the thumb is bent, and preferably at least the small finger is contracted relatively more than the other fingers of the gripping hand. Further the grip is designed to engage the gripping thumb and fingers to position and support them to facilitate desired generally neutral positioning of the hand relative to the associated forearm. In this regard it is desirable that the hand be generally aligned with the adjacent forearm. It is important that the wrist not be cocked or hyper extended. In particular, the back of the hand should be generally co-planner with the adjacent surface of the forearm within limits of no more than about 5–7 degrees either way. This significantly increases the stability of the hand. It is also desirable to limit, to the extent possible, excessive ulnar deviation (toward the little finger) or excessive radial deviation (toward the thumb). The knuckles are arranged generally in linear alignment with one another (although the knuckle of the little finger may be misaligned to some extent due to the greater contraction of that finger). The contours of the grip 10 generally conform to the matching contours of the gripping hand so that the user has a comfortable feeling when the grip is being held and so that the portions of the hand are positioned and supported as noted above.

For convenience, the grip 10 will be described as shown in FIGS. 1 and 2, extending generally upright, although its orientation might vary for different applications.

More particularly, as shown best in FIGS. 1A, 1D, 2A, 2C, 2D and 2E, the illustrated grip 10 is formed at a first or upper end 14 with a thumb support 18 that includes a generally upwardly facing thumb support surface or ledge 20. That surface 20 extends outwardly to one side of the base 12 and slightly downwardly. The surface 20 helps locate and support the thumb of the user extending generally forwardly and to the side as shown in FIG. 2D, with the thumb bent and the end digit inclined somewhat downwardly. The thumb support 18 also includes a generally upstanding locating surface 22 that extends generally transversely to the support surface 20 at the forward/sideward direction or angle noted above. The locating surface 22 engages the side of the gripping thumb. The surfaces 20, 22 combine to locate and maintain the gripping thumb in the desired comfortable, angled and bent position.

Figures 3D, 7A:
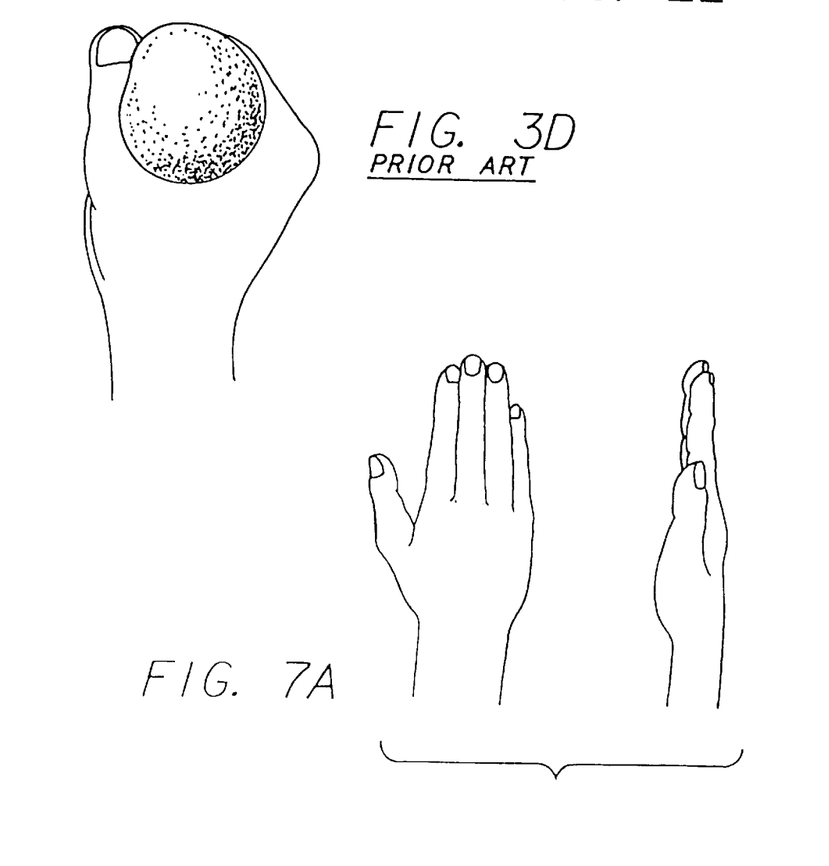
FIG. 3D is a top view of the prior art grip of FIG. 3A being held by a user.
FIG. 7A shows a plan and a side view of a hand in a neutral position.

FIG. 2D shows the desired position of a right hand wrapped around the illustrated grip 10 as viewed from the upper end 14 of the grip. It will be noted that the back of the hand is generally aligned or coplanar (rather than cocked) with regard to the adjacent surface of the forearm. FIGS. 2B and 2C show that hand wrapped around the grip 10 as viewed from the left and right. They show that the hand is not significantly tilted either toward the thumb or the little finger. Such tilting is illustrated in FIG. 7B. Thus, the hand and wrist are in a generally neutral position when the hand grasps the grip 10.

As shown best in FIGS. 1B, 1C, 2B and 2C, the illustrated grip 10 has a generally forwardly facing front edge portion 24 having individual indentations or grooves 26 for each accommodating one of the fingers of the gripping hand. This forward edge portion 24 generally engages so as to position and support the first joint (closest to the palm) of each of the fingers. This in turn tends to determine the alignment of the knuckles and facilitates aligning those knuckles in a generally straight line as viewed from the back of the hand.

As shown best in FIG. 2C, a generally rearwardly facing area or surface 28 of the grip is designed to engage so as to locate and support the palm area of the hand which is generally intermediate the fingers and the wrist. In particular, there is a slight depression 30 in the surface 28 to accommodate the portion of the palm adjacent to and just forwardly of the thumb.

The side surface 32 of the grip 10 between the forward and rearward edge portions 24, 28, which engages the palm of the hand adjacent to the fingers, is suitably contoured and selectively recessed to comfortably receive the joints between the fingers and the bones of the hand and to allow the grip to be squeezed without misaligning the knuckles as discussed above. In particular, there is a specific upper recess or depression 34 to accommodate the joint between the first finger and the second metacarpal of the hand. Further, the side palm engaging surface 34 has a lower recess 36 to accommodate the heel of the hand, i.e., the joint between the little finger and the adjacent metatarsal. This last accommodation is particularly significant as it contributes and facilitates the extended or increased contraction of the little finger relative to the other fingers as described above. In this connection, at the forwardly facing front end portion 24 of the grip, the lowermost groove 26a for the little finger is enlarged to facilitate that additional contraction.

The opposite side surface 38 of the grip 10 is generally flat as shown in FIGS. 1A, 1D and 2A. That surface 38 extends in a generally upright plane that is at alight sideward angle from the forwardly facing edge portion 24, to provide a comfortable positioning and resting stop for the ends of the gripping fingers. In this connection, the underside of the thumb support 18 is formed with a smooth angled undersurface 40 to provide a comfortable support and resting place for the end of the first finger of the gripping hand. This surface extends rearwardly at a slight outward angle outwardly from the forwardly facing edge portion 24.

The lower end 16 of the grip 10 is provided with an enlarged end portion 42 which serves as a guide and limit stop for the hand when it reaches for and engages the grip.

While the grip 10 will accommodate some variation in hand size, the size of the grip may be varied to fit different size user hands, particularly for women and children with normally smaller hands.

Exemplary Applications or Uses of the Grip for a Pulling Grip

Figure 4A:
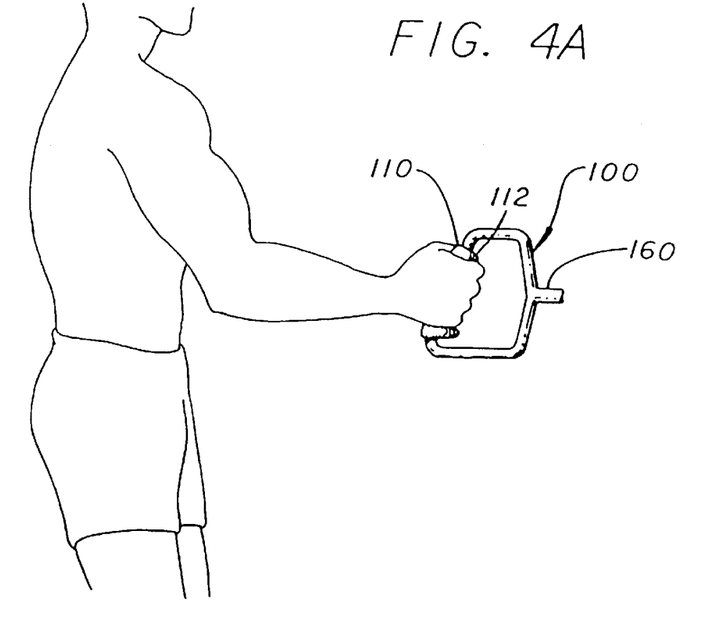
FIG. 4A illustrates the use of the ergonomic grip of FIG. 1A–1D for pulling.
Figure 4B:
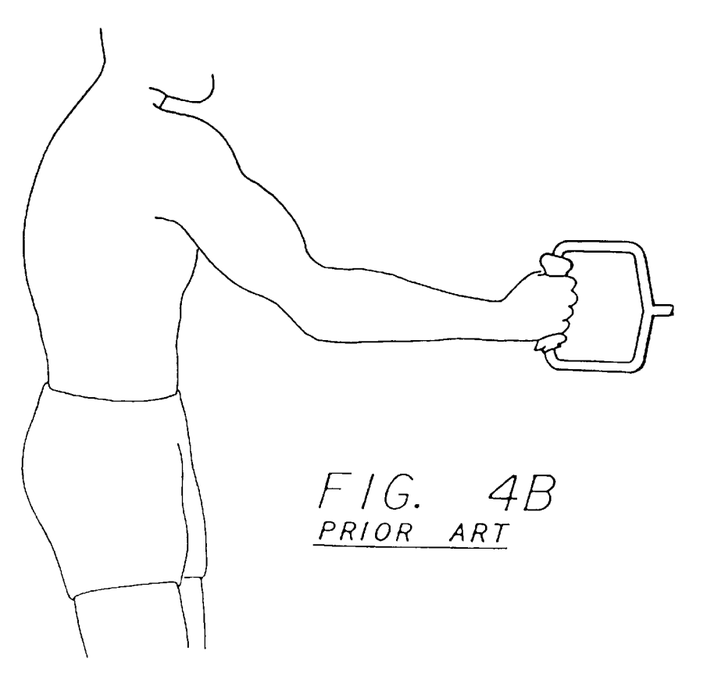
FIG. 4B illustrates the use of a conventional prior art upright hand grip for pulling.
Figures 4C, 5C, 8:
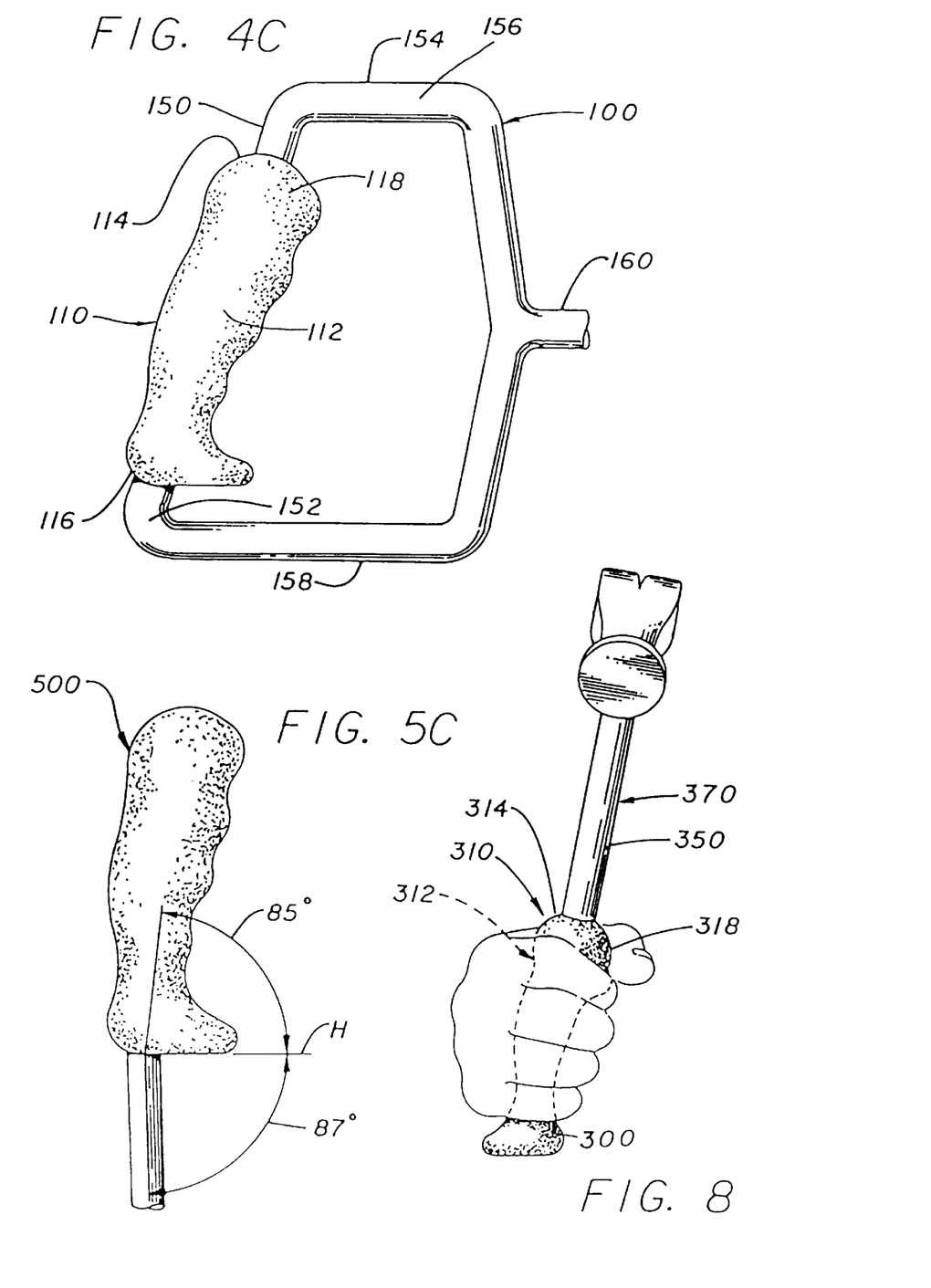
FIG. 4C is an enlarged side view of the pulling grip of FIG. 4A.
FIG. 5C is an enlarged left side view of the grip of FIGS. 1A–1D mounted on a ski pole.
FIG. 8 is a front view of the ergonomic grip of FIGS. 1A–1D incorporated into a hammer handle.

FIGS. 4A and 4C show the ergonomic hand grip of FIGS. 1 and 2 incorporated into a pulling grip or handle 100 that may be used for various pulling activities. The handle 100 includes a grip portion 110 which is essentially the same as the illustrated hand grip of FIGS. 1 and 2. The grip portion 110 has an elongated base 112 and a longitudinal axis. An extension portion 150 is attached to the end 114 of the base 112 adjacent to the thumb shelf 118. The extension portion 150 is generally collinear with the base 112 along the longitudinal axis. It should be noted that positioning the thumb shelf 118 off to one side of the base axis allows this collinear arrangement.

The illustrated handle 100 also has a second extension portion 152 connected to the other end 116 of the base 112. A generally U-shaped yoke 154 is connected to the extension portions 150, 152. More particularly the yoke 154 has two legs 156, 158. The leg 156 is connected to the extension portion 150 and the leg 158 is connected to the extension portion 152.

A connector element 160 is connected to the yoke 154 where the yoke legs 156,158 meet. The connector element 160 may be connected to any mechanism or structure for applying a pulling forces. Examples would be an exercise machine or a marine engine (for startup).

The illustrated base 112 is forwardly inclined or tilted. Good results have been achieved with the tilt being in the range between about true vertical and about 17 degrees forward from the vertical.

FIG. 4B shows a prior art conventional upright hand grip used for pulling activities. Using such a conventional grip upon contraction and pulling:

1. The chest, lateral part of the biceps, posterior part of the shoulder girdle, abdominals, and a large portion of the quadriceps are defeated.
2. Stress is placed upon the neck, shoulder, mid and lower back lateral part of the arm, wrist and hips.
3. There is a tremendous amount of torque generated upon the torso.
4. The angle of the torso increases and twists in an attempt to generate more force and maintain balance. This increases the amount of force exerted upon the back.
5. Leg action muscular occurs primarily in the lateral portions of the thighs.
6. The hips shift backward.
7. The angle of the thighs increases in an attempt to compensate for the instability of the body.
8. Knees and feet are stressed and assume unstable positions.

All of these things occur to keep the body from falling over. By way of contrast, when using the ergonomic hand grip of FIG. 4A for pulling:

1. The hand and the wrist stay in a neutral position.
2. The triceps and deltoid (shoulder area) are activated which allows the biceps, the pectorals, and abdominal, and the leg muscles to be utilized efficiently.
3. There is very little body lean; the torso and the shoulder girdle are stable platforms from which to use the arm and the chest muscles efficiently.
4. The muscle tension in the legs occurs down the middle of the thighs rather than the outside. This means that the knees are much more stable and less susceptible to injury.

For Ski Poles

FIG. 5A shows the illustrated hand grip of FIGS. 1 and 2 incorporated into ski pole handles 500 being used by a skier. As illustrated in FIG. 5C, the grip 510 of the ski pole handle 500 has a somewhat reduced forward tilt as compared to the grip of FIGS. 1 and 2. In a working prototype model of the ski poles, the forward angle was about 85 degrees from a generally horizontal reference plane H (See FIG. 5C), rather than the approximate 73 degrees shown in FIGS. 1 and 2 and used for pulling. The angle at which the grip meets the ski pole may vary somewhat. In the prototype, the ski pole extends at about an 87 degree angle (see FIG. 5C) from the generally horizontal reference plane H. In the prototype, each grip tilts outwardly about 2 degrees from vertical. This prototype functioned very satisfactorily during test usage.

Applicant believes that a forward angle in the range from about 90 degrees to about 83 degrees from horizontal would provide beneficial results. He believes the same for a range of ski pole angles from about 90 degrees to about 83 degrees from the horizontal plane. He also believes the same for a range of lateral outward angles between about true vertical to about 10 degrees from vertical.

FIG. 5B shows conventional ski pole handles or grips being used by a skier. Such conventional grips create a pattern of muscle tension that displaces the shoulder girdle illustrated in the pulling motion. As previously explained when the shoulders are displaced the hip joints will also be displaced. This causes instability in the other major points of the body, especially the knees.

Hand pressure is isolated in the thumb, index, and middle fingers which creates the muscle pattern that creates instability in the shoulders, hip and knees.

The thumb is placed in an elongated position. The thumb joints are unstable in this position and are susceptible to injury.

On a conventional grip there is a ridge which locks the thumb in place during a fall. During any attempt to release the ski pole the fingers and thumb extend. This places the thumb in a very vulnerable position because it is locked in place by the ridge of the ski pole grip. The pole torques and injury occurs.

The standard hand grip has been known to cause soft tissue, cartilage, or bone damage in the thumb area, so much so the injury is called "skier's thumb".

During a weight shift, (shifting the weight from one ski to the other, a common move in skiing), the hips and the shoulders move in opposing directions. The body is less balanced in the position and the knees are unstable.

Muscular action of the legs takes place primarily along the outside of the thighs. Without even muscular action on the thighs the knees are placed in an unstable position. The lateral leg muscles (outside edges of the thighs) are directly attached to the lower back. The placement of increased work loads on these muscles increases the stresses exerted upon the lower back.

During the weight shift the poles and the forearms will rotate inward (pronate) displacing the shoulders to a greater degree. Any movement of the pole will now require movement of the shoulder girdle.

By contrast, the Ergonomic Hand Grip shown in FIG. 5A offers a number of advantages:

1. Hand pressure is evenly distributed.
2. The thumb is placed in bent position on top of the ergo grip, this creates stability in the thumb joints. Now when the ski pole is twisted about during a hard fall, the thumb will not be entrapped by the ski pole grip avoiding injury. If the fingers extend in an attempt to release the pole, the thumb will release clearing the grip.
3. During a weight shift from one ski to the other the hips and shoulders move in unison, maintaining balance and keeping the center of gravity over the skis.
4. Muscular action in the legs occurs along the middle of the thighs, using the quadriceps evenly. This keeps the knees in a stable position reducing the probability of injury.
5. The forearms are stable and open during a weight shift rather then collapsing inward. This reduces the pressure exerted upon the neck and shoulders. Movement of the poles will not pivot from a stable position, which allows the efficient use of the arm and chest muscles.

For Bicycle Handle Bars

FIG. 6A shows the ergonomic hand grip of FIGS. 1 and 2 incorporated into two grips 610 on the generally horizontal cross handle bar of a mountain-type bicycle. The rider's body is titled forward as are the grips. For mountain bikes the angle of the grips is preferably adjustable. Good results have been achieved using a forward-upward angle of at least about 15 degrees from the horizontal (and if desired a somewhat larger angle). This can vary somewhat depending on the rearward sweep of the handle bar.

When the grips are used on a road bike or on an extension apparatus like the "Scott Aerobars" (these are usually attached to the handle bars of a road or mountain bike and allow the rider to rest their arms on provided supports as well as grasp the provided grips with their hands), the grips are used in more of a vertical but forwardly tilted position. The forward angle ideally is in the range between about 60 degrees and about 87 degrees from the horizontal.

The lateral angles will vary. Ideally it would be from about 57 degrees to about 88 degrees of inward rotation. Ideal angles vary because of the ability to adjust the vertical height of the handle bars or extender bars which changes the angle at which the forearms approach the grips.

FIG. 6B shows prior art conventional bicycle hand grips which result in a number of problems:

Whether the hands are parallel or perpendicular, the focus of the grip pressure occurs in the thumbs and index fingers.

The hands and wrists are unstable.

The elbows lift laterally away from the mid-line of the body.

The shoulders rotate forward and since the shoulders are attached to the back, it causes the following to occur:
1) Hips rotate as a reaction to the change of shoulder, and
2) Arc in the back increases which causes the hip position to change.

During leg action the primary muscle use occurs along the outside of the thighs. These muscles are attached predominantly in the back so to accomplish leg action the torso will shift from side to side.

By contrast, the ergonomic bicycle grips of FIG. 6A offers a number of advantages, including the following:

1) Elbows drop to a lower position more in direct alignment with the shoulder.
2) Shoulders and back are not as arched. (Therefore the hips are not as displaced).
This creates less stress on the neck and back.
3) Muscle action occurs along the mid-line of the thighs, rather than the outside.

Hips are not displaced, keeping the hip joints in more of a neutral position, allowing the knee to move in a vertical line rather than an oval. Less stress on the knees and a more efficient use of the leg muscles results.

For Use with Extensions

FIG. 8 shows the illustrated ergonomic hand grip of FIGS. 1–2 incorporated into the handle 300 of a handtool, more particularly a hammer 370.

Similarly to the pull handle 100, in handle 300 the sideward off-set of the thumb ledge 318 allows the adjacent end 314 of the grip 310 to be attached or connected to an extension section 350, with the base 312 and the extension section 350 being generally coextensive along the axis of the base.

Various modifications can be made to the illustrated structure without departing from the spirit and scope of the invention as set forth in the following claims.

What is claimed is:

1. An ergonomic elongated handgrip for being held in a hand of a user, which handgrip when disposed generally upright and gripped with the thumb of the user's hand prevents pronation of the first metacarpal and the thumb, and which grip comprises:

a) an elongated base having a central longitudinal axis and upper and lower opposed ends, and a series of generally transversely extending finger receiving grooves, each of which extends partially around said base, said grooves being spaced apart longitudinally on said base, the circumference of said base increasing upwardly from the lowermost groove to the uppermost groove, the base's reduced circumference allowing greater contraction of the small finger of the gripping hand at a joint between the phalanges and metacarpals, than the contraction of the comparable joints of the other three fingers of the gripping hand, on said base and b) a thumb support adjacent to said upper end of said base, said thumb support extending generally transverse to the axis of said base to one side of the axis having a slightly arcuate surface so as to position and support the thumb of the gripping hand in a bent position to one side of the axis with a bend in both joints of the thumb.

2. The grip of claim 1 wherein said thumb support also includes a lateral support surface located between said support surface and the axis, said lateral support surface extending generally transversely to said support surface.

3. A pair of the grips of claim 1 each in combination with an elongated ski pole having a first end, said ski pole being usable in a generally upright orientation with said first end of said ski pole being oriented uppermost, each grip being attached to said associated ski pole via said second end of said base of said grip attaching to said first end of said associated ski pole.

4. The grips of claim 3 wherein each of said grips is configured and arranged for use with said first end of said base being tilted somewhat forwardly.

5. The grips of claim 4 wherein first end of said base is tilted forwardly from about zero degrees to about 17 degrees from the vertical.

6. A pair of grips of claim 1 in combination with a bicycle handlebar that is disposed generally horizontally, said grips each being attached at said second end of said base to said handlebar.

7. The grips of claim 6 wherein the handlebar is for use on a mountain type bicycle and said grips extended generally horizontally but somewhat upwardly from said handlebar.

8. The grips of claim 6 wherein said handlebar is for use with a road type bicycle or an extension on a mountain type bicycle and said grips extend generally upright but tilt somewhat forwardly.

9. The grip of claim 1 in combination with equipment actuated by pulling on said grip.

10. The grip of claim 1 having an extension section attached to said first end of said base and being generally collinear with said base along the axis.

11. The grip of claim 10 in combination with a tool attached to said extension section.

12. The grip of claim 10 in combination with an apparatus designed for being acted upon by pulling forces, said grip further including a connector element connected to said extension section and disposed for being connected to said apparatus.

13. The grip of claim 12 wherein said forwardly directed portion includes individual indentations for each finger.

14. The grip of claim 13 wherein said indentation for the small finger of the gripping hand is disproportionately larger than said indentations for the other fingers of the gripping hand to facilitate greater contraction of the small finger than the two uppermost fingers of the gripping hand when gripping.

15. The grip of claim 14 wherein said indentation for the ring finger of the gripping hand is also disproportionately larger than said indentations for the two uppermost fingers of the gripping hand to facilitate greater contraction of the ring finger than the two uppermost fingers of the gripping hand when gripping.

16. The handgrip of claim 1 wherein said base has a generally sidewardly directed portion contoured for engaging so as to position and support the areas of the inside of the gripping hand generally aligned with the knuckle joint, said generally sidewardly directed portion including an elongated generally upright recess for receiving at least the knuckle joints of the first and index fingers of the hand so as to maintain said joints generally aligned with one another.

17. The handgrip of claim 1 wherein said base also has:

a) a generally sidewardly directed portion, an elongated inward contour for engaging a hand, so as to position and support the areas of the inside of the digits of the fingers of the gripping hand where the fingers join to the palm, and a generally rearwardly directed portion, contoured for engaging a hand, so as to position and support an intermediate palm area.

18. The grip of claim 17 wherein the generally rearwardly directed portion includes a recess for receiving the palm area around the second metacarpal of the gripping hand.

19. The grip of claim 17 wherein said grip is configured and designed for use with said base tilted forwardly from about zero degrees to about 17 degrees from the vertical.

20. The grip of claim 1 wherein the thumb support surface is inclined downwardly as it extends radially away from the central axis to support the thumb so that the inside of the thumb is rotated toward the palm of the hand.

21. The grip of claim 1 wherein the generally sidewardly directed portion includes a lower recessed portion for the heel portion of the palm area of the gripping hand around the joint of the small finger and the associated metacarpal.

22. The grip of claim 1 wherein said upper and lower ends are each solid continuous surfaces adapted to restrict engagement with another device.

23. A ergonomic hand grip for being held in a hand of a user comprising:

a) an elongated base having an upper and lower end, b) a slightly arcuate thumb locating and supporting ledge adjacent to said upper end of said base, and extending outwardly from, c) a series of generally transversely extending finger-receiving grooves extending at least partially around said base and spaced apart longitudinally of said base, said grooves being positioned longitudinally on said base so that when said grip is held by the hand of the user, said ledge is positioned relative to the thumb on the hand so that the thumb rests upon said ledge in a bent position with a bend in both joints of the thumb rather than an extended position, said groove for the small finger of the hand being sufficiently reduced in circumference beyond what is required to accommodate the shorter length of the small finger relative to the lengths of the remaining fingers of the hand so that when said grip is held by the hand of the user, the small finger received in said groove contracts substantially more than the remainder of the fingers of the hand.

24. The grip of claim 23, wherein said upper and lower ends are each solid continuous surfaces adapted to restrict engagement with another device.

25. The grip of claim 23 further including an enlarged portion below the lowermost of said longitudinally positioned grooves.

26. An ergonomic handgrip for being held in a hand of a user comprising:
- an elongated base having a central longitudinal axis and upper and lower opposed ends, said base having a reduced circumference adjacent said lower end to allow greater contraction of the small finger of the gripping hand at the joint between the phalanges and metacarpals than the contraction of the comparable joints of the other three fingers of the gripping hand, said base, when disposed generally upright, also having an enlarged circumference at said upper end; and
- a generally forwardly directed portion contoured for engaging so as to position and support the areas of the palm of the inside of the gripping hand where the fingers join to the palm, said forwardly directed portion includes four individual indentations one for each finger, said indentation for the small finger of the gripping hand being disproportionately larger than said indentations for the other fingers of the gripping hand to facilitate greater contraction of the small finger than the two uppermost fingers of the gripping hand when gripping, said indentation for the ring finger of the gripping hand being disproportionately larger than said indentations for the two uppermost fingers of the gripping hand to facilitate greater contraction of the ring finger than the two uppermost fingers of the gripping hand when gripping:
  - a generally sidewardly directed portion contoured for engaging so as to position and support the areas of the inside of the gripping hand where the fingers join to the palm; and
  - a generally rearwardly directed portion contoured for engaging so as to position and support the intermediate palm area of the gripping hand;
  - a thumb support adjacent to said upper end of said base, said thumb support including a support surface extending generally transverse to the axis of said base and extending to one side of the axis and adapted to position and support the thumb of a gripping hand in a bent position to one side of the axis with a bend in both joints of the thumb, and
  - an enlarged portion below said little finger indentation.

27. The grip of claim 26, wherein said upper and lower ends are each solid continuous surfaces is adapted to restrict engagement with another device.

28. In the grip of claim 26 wherein the sidewardly directed portion contoured to position and support the areas of the inside of the gripping hand, has an elongated recess contoured for such purpose.

29. An ergonomic hand grip for being held in a hand of a user comprising:
- an elongated base having a central longitudinal axis and first and second opposed ends, said first and second ends each being solid continuous surfaces adapted to restrict engagement with another device, said base having a reduced circumference adjacent said second end to allow greater contraction of the small finger of the gripping hand at the joint between the phalanges and metacarpals and at the distal joint than the contraction of the comparable joints of the other three fingers of the gripping hand;
- a thumb support adjacent to said first end of said base, said thumb support including a support surface extending generally transverse to the axis of said base and extending to one side of the axis so as to position and support the thumb of the gripping hand in a bent position to one side of the axis with a bend in both joints of the thumb; and
- an enlarged portion at said second end of said base.

30. An elongated handgrip, when disposed generally upright, comprising:
- an elongated body having a longitudinal generally central axis, the body having an upper end and a lower end, the body having a generally smooth contoured outer surface comprising a series of elongated surface portions that extend generally upright and parallel to the axis and are arranged circumferentially around the axis to engage a hand of a user with the palm and the fingers of the hand wrapped around the body surface and with the thumb uppermost, said surface portions comprising first, second, third and fourth portions,
- said first elongated surface being contoured for engaging the innermost digits of the fingers of a user's hand, said surface portion having a series of longitudinally spaced apart recesses for each receiving one of said digits, said second elongated surface portion being sidewardly directed and being contoured for engaging the portion of the palm of the user's hand generally aligned with the knuckle joints, said second surface portion having an elongated recess extending generally upright and parallel to said axis for receiving and generally aligning at least the top two knuckles of a user's hand;
- said third elongated surface portion being rearwardly directed and being contoured for engaging the remaining portions of a user's palm including the thumb pad, said third surface portion being generally at a right angle to said second surface portion, and being wider over at least most of its height than said first surface portion,
- said fourth portion being contoured for engaging the end two digits of the fingers of a user's hand in bent encircling condition, said fourth surface portion being angled so that it is generally further from the second surface portion where it meets the third surface portion than it is from the second surface portion where it meets the third surface portion, the area of said body's upper end that is generally opposite from said second surface portion, being contoured with a thumb positioning and supporting ledge that extends generally transverse to the central axis, said thumb supporting ledge facing generally upwardly, the thumb supporting ledge commencing at the upper end of the third surface portion, then sloping upwardly to provide a support for the intermediate digit of the thumb so that that digit extends slightly upwardly, then sloping back downwardly to provide a support for the outermost digit of the thumb so that the digit extends back downwardly, whereby the thumb is supported with both joints bents;
- said thumb support ledge being inclined downwardly as it extends rapidly away from the central axis to support the bent thumb so that the inside of the thumb is rotated toward the palm of the hand.

* * * * *